United States Patent
Fujita et al.

(10) Patent No.: US 9,229,679 B2
(45) Date of Patent: Jan. 5, 2016

(54) IMAGE DISTRIBUTION APPARATUS, DISPLAY APPARATUS, AND IMAGE DISTRIBUTION SYSTEM

(71) Applicants: Yohei Fujita, Kanagawa (JP); Takeshi Fujita, Tokyo (JP); Yasuharu Yanamura, Kanagawa (JP); Tetsuro Kutsuwada, Kanagawa (JP); Akira Masuda, Tokyo (JP); Kohichi Nishide, Tokyo (JP)

(72) Inventors: Yohei Fujita, Kanagawa (JP); Takeshi Fujita, Tokyo (JP); Yasuharu Yanamura, Kanagawa (JP); Tetsuro Kutsuwada, Kanagawa (JP); Akira Masuda, Tokyo (JP); Kohichi Nishide, Tokyo (JP)

(73) Assignee: RICOH COMPANY, LTD., Tokyo (JP)

(\*) Notice: Subject to any disclaimer, the term of this patent is extended or adjusted under 35 U.S.C. 154(b) by 291 days.

(21) Appl. No.: 13/906,443

(22) Filed: May 31, 2013

(65) Prior Publication Data
US 2013/0328746 A1 Dec. 12, 2013

(30) Foreign Application Priority Data
Jun. 7, 2012 (JP) .................. 2012-130144

(51) Int. Cl.
*G06F 3/14* (2006.01)
*G09G 5/14* (2006.01)
*H04N 7/15* (2006.01)

(52) U.S. Cl.
CPC ............ *G06F 3/1454* (2013.01); *G06F 3/1462* (2013.01); *G09G 5/14* (2013.01); *G09G 2340/0407* (2013.01); *G09G 2340/0485* (2013.01); *G09G 2340/12* (2013.01); *G09G 2370/042* (2013.01); *H04N 7/15* (2013.01)

(58) Field of Classification Search
CPC combination set(s) only.
See application file for complete search history.

(56) References Cited

U.S. PATENT DOCUMENTS

| 5,917,470 A | * | 6/1999 | Fujioka ................... 345/660 |
| 8,005,898 B2 | * | 8/2011 | Sato et al. .................. 709/205 |
| 2006/0136828 A1 | | 6/2006 | Asano |
| 2011/0080426 A1 | * | 4/2011 | Nakamori .................. 345/634 |

FOREIGN PATENT DOCUMENTS

JP 2006-172193 6/2006

\* cited by examiner

*Primary Examiner* — Van Chow
(74) *Attorney, Agent, or Firm* — Harness, Dickey & Pierce, P.L.C.

(57) ABSTRACT

An image distribution apparatus which is connected to multiple display apparatuses and which includes a distribution unit which distributes an image displayed in the display apparatuses is disclosed. The image distribution apparatus includes a specifying unit which designates an area of the image, wherein the distribution unit distributes information indicating an area designated by the specifying unit.

4 Claims, 18 Drawing Sheets

FIG.4

| IMAGE DATA | IMAGE SIZE (HORIZONTAL × VERTICAL) | TEXT SIZE | ... |
|---|---|---|---|
| IMAGE DATA A | 1280 × 960 | 14 POINT | ... |
| IMAGE DATA B | 2048 × 1560 | 12 POINT | ... |
| IMAGE DATA C | 640 × 480 | 10 POINT | ... |
| ... | ... | ... | ... |

121

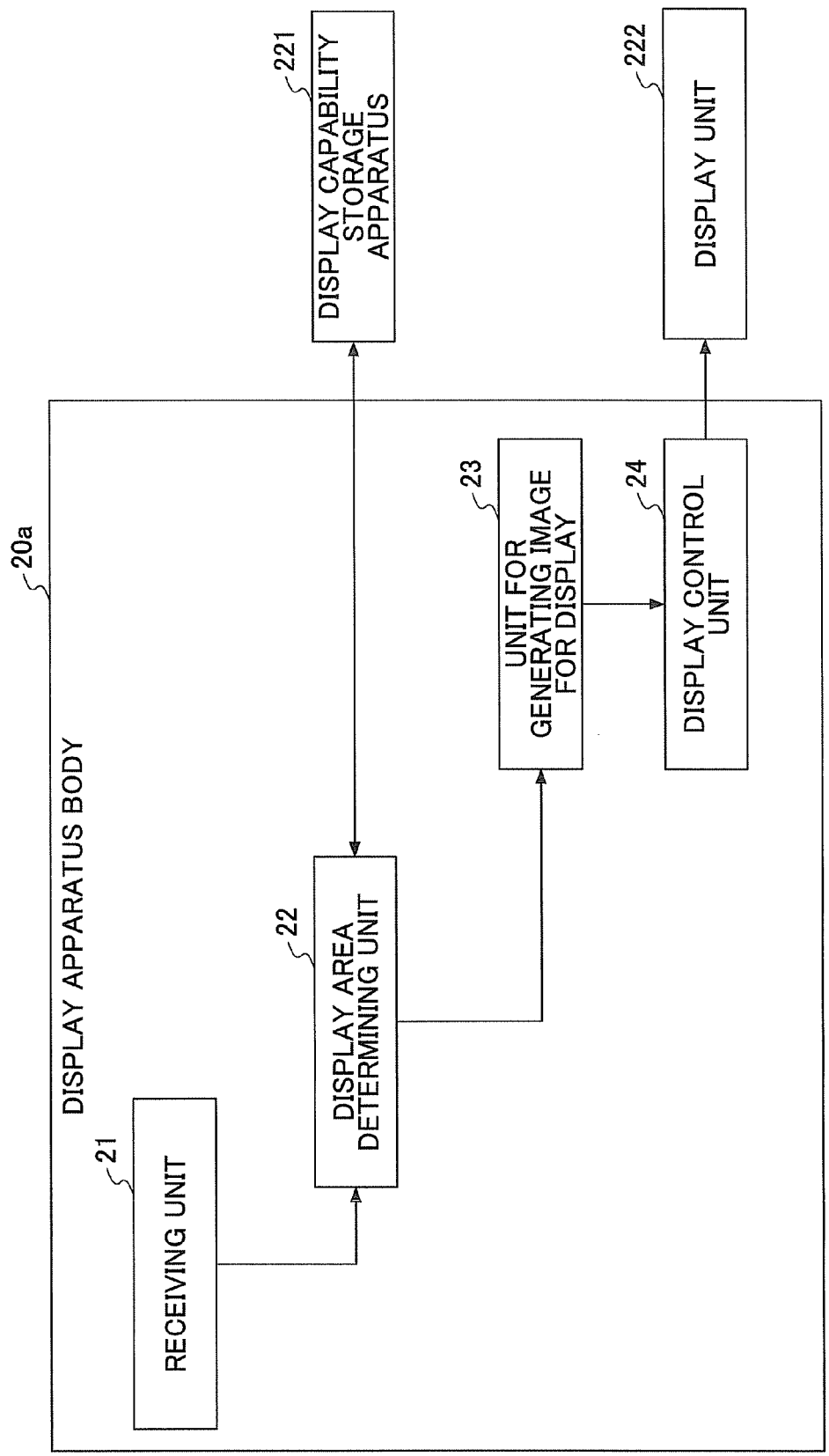

FIG.12

| TOTAL NUMBER OF PIXELS DISPLAYABLE | SCREEN SIZE | REFERENCE VALUE OF TEXT SIZE FOR DISPLAY | |
|---|---|---|---|
| 1024 × 768 | 12.1 INCH | 16 POINT | ... |
| | | | ... |

| TOTAL NUMBER OF PIXELS DISPLAYABLE | SCREEN SIZE | SCREEN LAYOUT TYPE |
|---|---|---|
| 1024 × 768 | 12.1 INCH | PICTURE AND PICTURE |

221

IMAGE DISTRIBUTION APPARATUS, DISPLAY APPARATUS, AND IMAGE DISTRIBUTION SYSTEM

TECHNICAL FIELD

The present invention relates to image distribution apparatuses, display apparatuses, and image distribution systems.

BACKGROUND ART

In recent years, there has been known a technique which makes it possible to mutually share not only a video of a counterparty, but also a desktop screen of a terminal or a screen of an application in a remote communications system such as a teleconferencing system, a web conferencing system, etc., which use a network.

Moreover, when a part of an image is specified in a server which shares a screen, an image whose position/size is the same as that of the specified part is displayed on a screen of a client terminal (Patent document 1).

On the other hand, with respect to a terminal which uses the remote communications system, diversification is in progress, such as a PC which is reduced in size and weight (for example, a Netbook), a tablet terminal, a smartphone, etc.

In the web conferencing system, which is one of the remote communications systems, it is a common usage form that, while sharing a screen of presentation material, a presenter makes an explanation along the material to conference participants.

In the web conferencing, from a display capability of a screen sharing server which shares a screen with other client terminals, that of a client terminal in which a shared screen is displayed may differ. Therefore, when an image size of original image data which is shared from the server side exceeds the number of pixels displayable on the client terminal side, for example, in a screen of the client terminal, a part of an image is chipped off, so that it cannot be displayed. Moreover, when the screen of the client terminal is small, for example, a letter displayed on the screen becomes too small, so that it is difficult to see contents of shared material.

In Patent document 1, with an operation of a user of a server (a presenter), a screen whose position and size is the same as a screen on which the part of the image specified on the server side is displayed on the client side.

However, it is common for the web conferencing to be conducted remotely, so that it is not realistic for the presenter to check display capabilities of screens of multiple client terminals and perform screen displaying for each terminal in accordance with a display capability of a screen on the counterparty side, causing material to be shared difficult to see depending on the display capability of the screen on the counterparty side.

Patent document 1: JP2006-172193A

DISCLOSURE OF THE INVENTION

In light of problems as described above, an object of the present invention is to provide an image distribution apparatus which generates information for displaying a screen which is easy to see in accordance with a display capability of a terminal which receives an image.

According to an embodiment of the present invention, an image distribution apparatus which is connected to multiple display apparatuses and which includes a distribution unit which distributes an image displayed in the display apparatuses is provided, including a designating unit which designates an area of the image, wherein the distribution unit distributes information indicating the area designated by the designating unit.

The present invention makes it possible to provide an image distribution apparatus which generates information for displaying a screen which is easy to see in accordance with a display capability of a terminal which receives an image.

BRIEF DESCRIPTION OF THE DRAWINGS

Other objects, features, and advantages of the present invention will become more apparent from the following detailed descriptions when read in conjunction with the accompanying drawings, in which:

FIG. 4 is a diagram showing one example of a configuration of an image information storage apparatus;

FIG. 6 is a diagram showing one example of a functional configuration of the display apparatus according to a first embodiment of the present invention;

FIG. 12 is a diagram showing one example of a configuration of information stored in the display capability storage apparatus according to a second embodiment of the present invention;

FIG. 17 is a diagram showing one example of a configuration of information stored in the display capability storage apparatus according to a variation of the embodiments of the present invention.

BEST MODE FOR CARRYING OUT THE INVENTION

Below, embodiments of the present invention are described with reference to the drawings.

(First Embodiment)

(System Configuration)

Figure 1A:
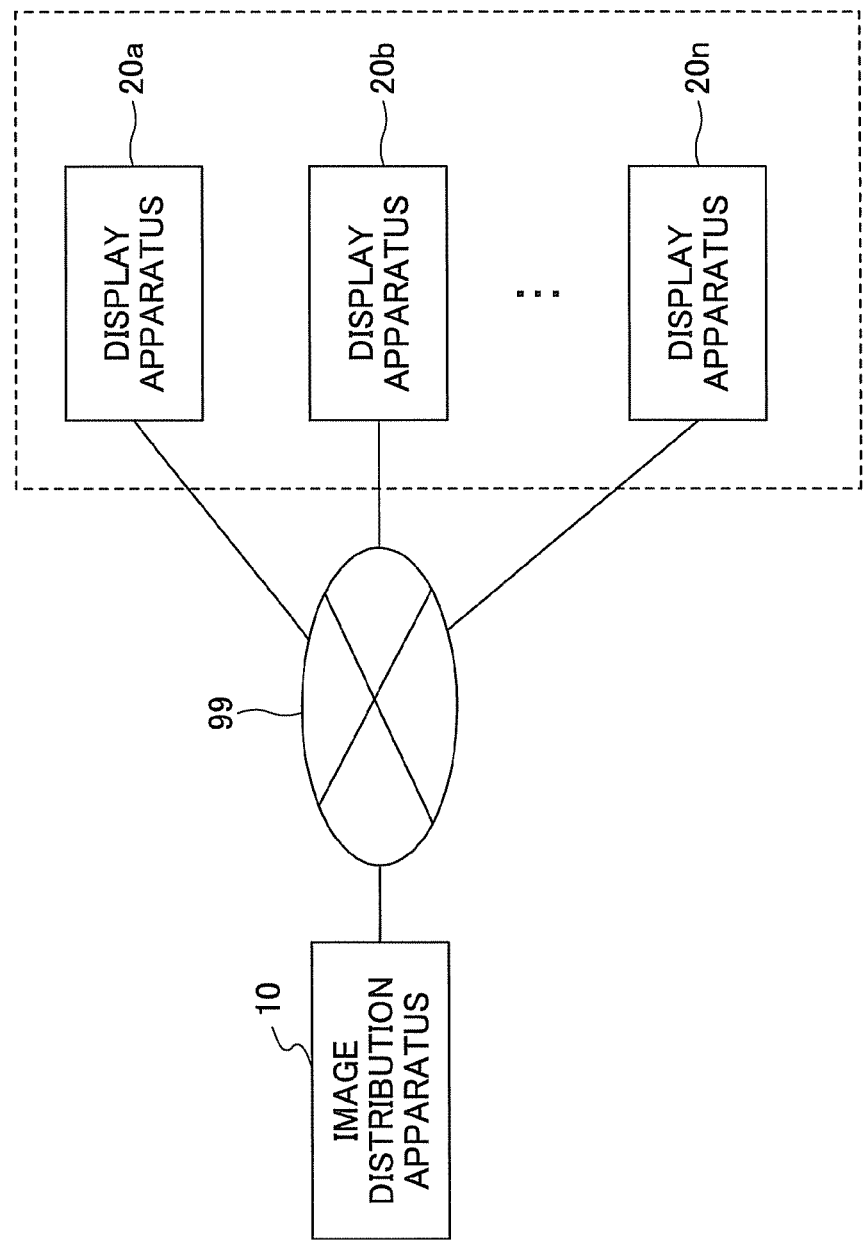
FIGS. 1A and 1B are diagrams illustrating an exemplary configuration of an image distribution system according to an embodiment of the present invention.

FIG. 1A is a diagram showing an exemplary configuration of an image distribution system 1 according to an embodiment of the present invention.

An image distribution system includes a data provision system which distributes content data in one direction from one information processing apparatus (for example, a PC (Personal Computer)) to the other information processing apparatus and a communications system which mutually communicates information among multiple information processing apparatuses. An image distribution system includes a web conferencing system and a PC screen sharing system, etc., for example. The web conferencing system is a communications system in which a communications function such as voice, video, etc., and a function for sharing material and software are integrated.

The image distribution system 1 shown in FIG. 1A includes an image distribution apparatus 10; and n display apparatuses 20a, 20b, . . . , 20n (below called "display apparatuses" when not distinguishing therebetween). The image distribution apparatus 10 and the display apparatus 20 are communicatively connected via a network 99 (wired or wireless) such as a LAN (Local area network), the Internet, etc.

The image distribution apparatus 10 is an equipment unit which includes an information input function, an information display function, a communications function, etc. In the present embodiment, the image distribution apparatus 10 is a computer which distributes, to the display apparatus 20, image data for displaying on a screen of the display apparatus 20. Here, the image data represent, for example, data utilized using presentation software, spreadsheet software, document preparation software, and image data for an application window and a desktop screen. An example of the image distribution apparatus 10 includes a PC, a smartphone, a tablet-type terminal, a PDA (personal digital assistant), etc.

The display apparatus 20 is an equipment unit which includes an information input function, an information display apparatus, a communications function, etc. In the present embodiment, based on image data distributed from the image distribution apparatus 10, the display apparatus 20 generates an image for displaying and displays the image for displaying on the screen. An example of the display apparatus 20 includes a PC, a smartphone, a tablet-type terminal, a PDA, etc.

An equipment unit which makes up the image distribution system 1 may include functions of both the image distribution apparatus 10 and the display apparatus 20.

Figure 1B:
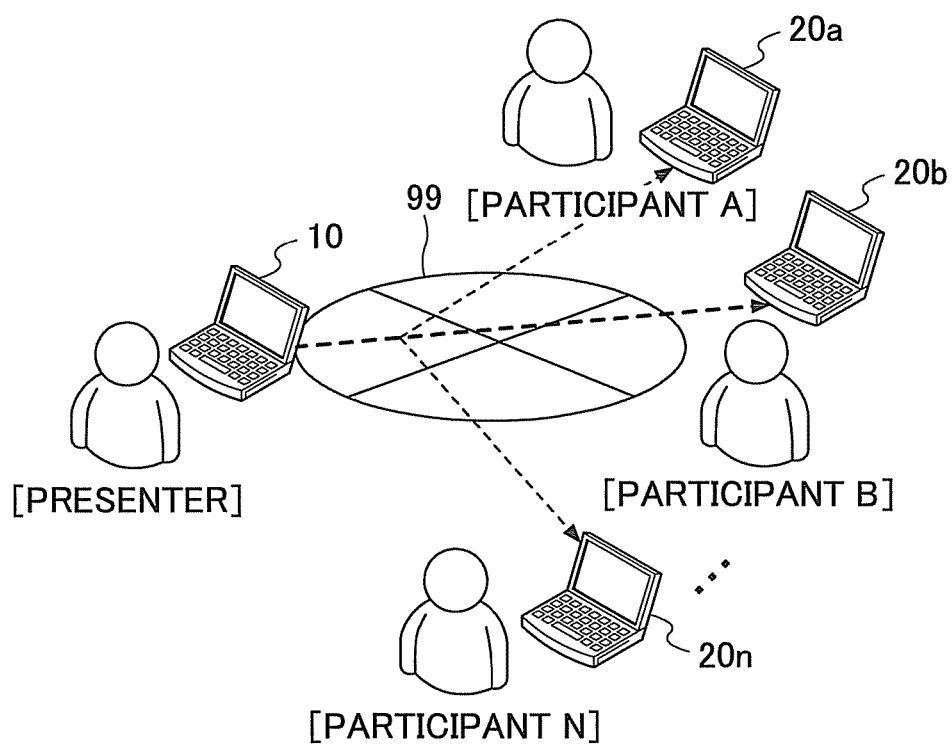

FIG. 1B is a diagram showing an example of a case in which the image distribution system 1 according to the embodiment of the present invention is used in a web conference (a usage scene). In this case, the image distribution system 1 according to a first embodiment of the present invention is used as follows:

(1) First, the image distribution apparatus 10, and the display apparatuses 20a, 20b, . . . , 20n are communicatively connected via a network 99. Moreover, in the image distribution apparatus 10 and the display apparatuses 20, software (for example, an application for conferencing system) which implements distribution and reception of an image and screen sharing, etc., in the respective apparatuses is installed.

(2) When a user (a presenter) of the image distribution apparatus 10 launches the application for conferencing system and selects presentation material (image data) to be distributed to the display apparatus 20 from a menu screen of the application, the image data are displayed on a display of the image distribution apparatus 10. The image data may be held in a storage area included in the image distribution apparatus 10, or may be held in an external storage area such as a file server, etc. In the present embodiment, the image data are data of a Bitmap format. The image data include still and video images. Moreover, the image data may be data other than a Bitmap format such as JPEG (Joint Photographic Experts Group), JPEG 2000, MPEG (Moving Picture Experts Group), AVI (Audio Video Interleave), etc.

(3) In the display of the image distribution apparatus 10 in which the image data are displayed, the presenter performs area designation in which the presenter designates, by a pointer operation, etc., an area to which he would like a participant to pay attention and obtains a set of coordinate values corresponding to the designated area. A point is included in the area.

(4) When the presenter performs an input operation for distributing image data selected, information (below called "designated area information") of the set of coordinate values corresponding to the designated area, an image size, and the image data is distributed to a display apparatus 20. Here, the image size is a data amount of the image data and a total number of pixels (horizontal×vertical).

(5) In the display apparatus 20, the application for conferencing system has been launched in advance. When the image data, image size, and designated area information distributed is received in this state, a display image based on a display capability of a display of the display apparatus 20 is generated. The display capability of the display is the total number of pixels (horizontal×vertical) which can be displayed by the display, determining whether the display capability of the display is of at least the image size received, and determining the display area. Here, the display area refers to a range to be displayed on a display out of the received image. When the display capability of the display is at least the image size, an area which is caused to be displayed in a center of the display as a size of the distributed image data as they are is set to be the display area. On the other hand, when the display capability of the display is less than the image size, an area in which an area based on the designated area information out of the image data is moved to the center of the display is set to be the display area.

As described above, in the image distribution system 1 according to the first embodiment of the present invention, image data focused on by the presenter is displayed on a display in accordance with a display capability of the display of the display apparatus 20, so that, even when the display capability of the display of the display apparatus 20 is low, it is facilitated for the participant to see the presentation material and to understand the explanations of the presenter.

(Hardware Configuration)

(Image Distribution Apparatus)

Figure 2:
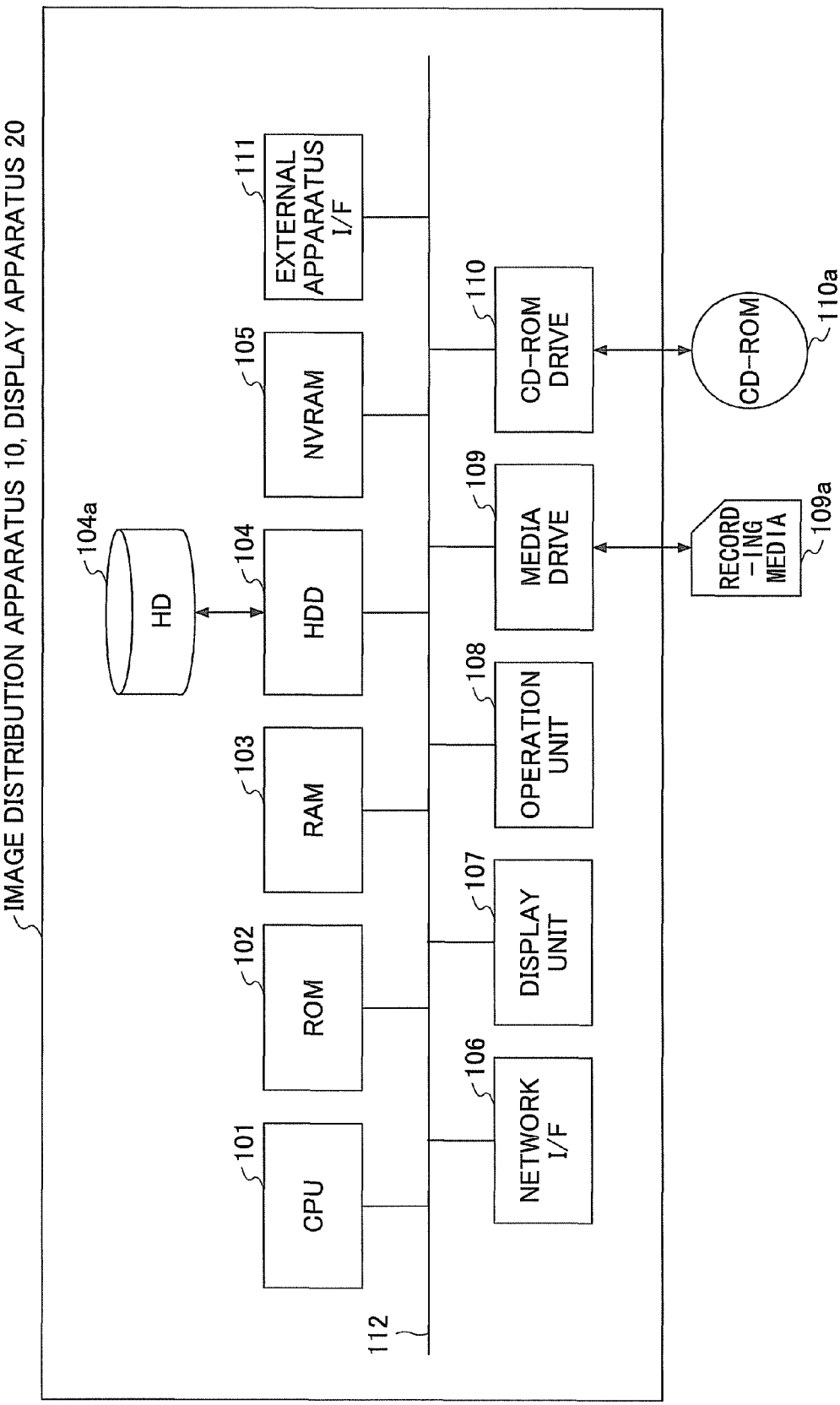
FIG. 2 is a diagram illustrating one example of a hardware configuration of the image distribution apparatus or a display apparatus according to the embodiment of the present invention.

FIG. 2 is a diagram showing one example of a hardware configuration of the image distribution apparatus 10 according to a first embodiment of the present invention. In FIG. 2, the image distribution apparatus 10 includes a CPU 101, a ROM 102, a RAM 103, an HDD 104, an NVRAM 105, a network I/F 106, a display unit 107, an operation unit 108, a media drive 109, a CD-ROM drive 110, an external apparatus I/F 111, a bus line 112, etc.

In the ROM 102 are stored, for example, various programs including an application for conferencing system and data which are used by the programs, etc. The RAM 103 is used as a storage area for loading therein the programs and a work area, etc., for the programs loaded. The CPU 101 implements various functions by processing the programs loaded into the RAM 103. In accordance with control of the CPU 101, the HDD (hard disk drive) 104 controls reading or writing of data with respect to an HD (hard disk) 104a in which various data are stored. In the NVRAM 105 are stored various setting information sets, etc., of the image distribution apparatus 10.

The network I/F 106 is a hardware unit for connecting to a network 99 (wired or wireless) such as a LAN, etc.

The display unit 107 is a user interface screen such as liquid crystal, organic EL, etc., to which display outputting of various information sets such as a cursor, a menu, a window, a character, an image, etc., is made to a user.

The operation unit 108 is a soft key by means of a touch panel, a mouse, a button, a hard key, etc., for the user to perform input operations such as setting, instructions, etc. What the operations are is reported to the CPU 101.

The display unit 107 may include a touch panel which has integrated therewith the operation unit 108.

The media drive 109 controls reading or writing (storage) of data with respect to recording media 109a such as a flash memory, etc.

The CD-ROM drive 110 controls reading or writing of data with respect to a CD-ROM (Compact Disc Read Only Memory) 110a as one example of detachable recording media.

The external apparatus I/F 111 transmits and receives information with an external apparatus.

The bus line 112 is an address bus or a data bus, etc., for electrically connecting the respective elements as shown in FIG. 2.

Programs are recorded in a computer-readable recording medium such as a recording medium 109a, a CD-ROM 110a, etc., in a file in an installable format or an executable format, and may be loaded into the RAM 103.

Display Apparatus

The display apparatus 20 includes a hardware configuration as shown in FIG. 2, which is similar to that of the image distribution apparatus 10. Therefore, explanations are omitted.

Operation Overview of Hardware

In a first embodiment of the present invention, hardware operations are as follows:

(1) First, a user (a presenter) of the image distribution apparatus 10 uses a keyboard, a mouse, etc., which represent the operation unit 108 to perform an input operation for launching an application for conferencing system. When what is input is reported from the operation unit 108 to the CPU 101, the CPU 101 launches an application for conferencing system that is installed in the NVRAM 105 in advance.

(2) When the presenter operates an initial screen of the application for conferencing system displayed in the display unit 107, image data selected is displayed on a screen. The displayed screen is distributed to the display apparatus. If the image data are stored in the HD 104a, for example, when an input instruction of the presenter is accepted, the CPU 101 controls the HDD 104, reads the image data stored in the HDD 104a, and causes the read image data to be displayed in the display unit 107. The image data may be stored in recording media 106a, which are external recording media, or a storage area of the image distribution apparatus 10 other than the HD 104a.

(3) In the screen displayed in the display unit 107, an area which the presenter would like a user (a participant) of the display apparatus 20 to pay attention to is designated. Here, the area is, for example, determined by coordinate values of a pointer positioned on the display unit 107 at a starting point and at an ending point by a drag and drop operation of the operation unit 108 (a mouse). Information (below called "designated area information") of coordinate values which show a designated area is stored in the RAM 103. When an area is not designated by the presenter, for example, a set of coordinates in the center of a display screen is to be designated.

(4) When an input instruction for image distribution is performed by the user of the image distribution apparatus 10, the CPU 101 obtains the image data, image size, and designated area information from the respective storage areas such as the RAM 103, etc. The network I/F 106 is controlled, and the obtained image data, image size, and designated area information are distributed to the display apparatus 20.

(5) In the display apparatus 20, the CPU 101 launches in advance an application for conferencing system that is installed in the NVRAM 105. In this state, when the image data, image size, and designated area information distributed via the network I/F 106 of the display apparatus 20 are received, a display capability of the display unit 107 stored in the NVRAM 105 is obtained.

(6) Thereafter, an image size of the received image data and the display capability of the display unit 107 are compared and, when the display capability of the display unit 107 exceeds the image size, an image for display that is displayed on the display unit 107 in a size as is of the image data distributed is generated. On the other hand, when the display capability of the display unit 107 of the display apparatus 20 is lower than the image size, with an area based on designated area information out of image data as a center, an image for display is generated based on image data magnified to a size balanced with the display capability of the display unit 107 from the center.

(7) Based on an instruction from the CPU 101, an image for display that is generated is displayed in the display unit 107.

(Functional Configuration)

(Image Distribution Apparatus)

Figure 3:
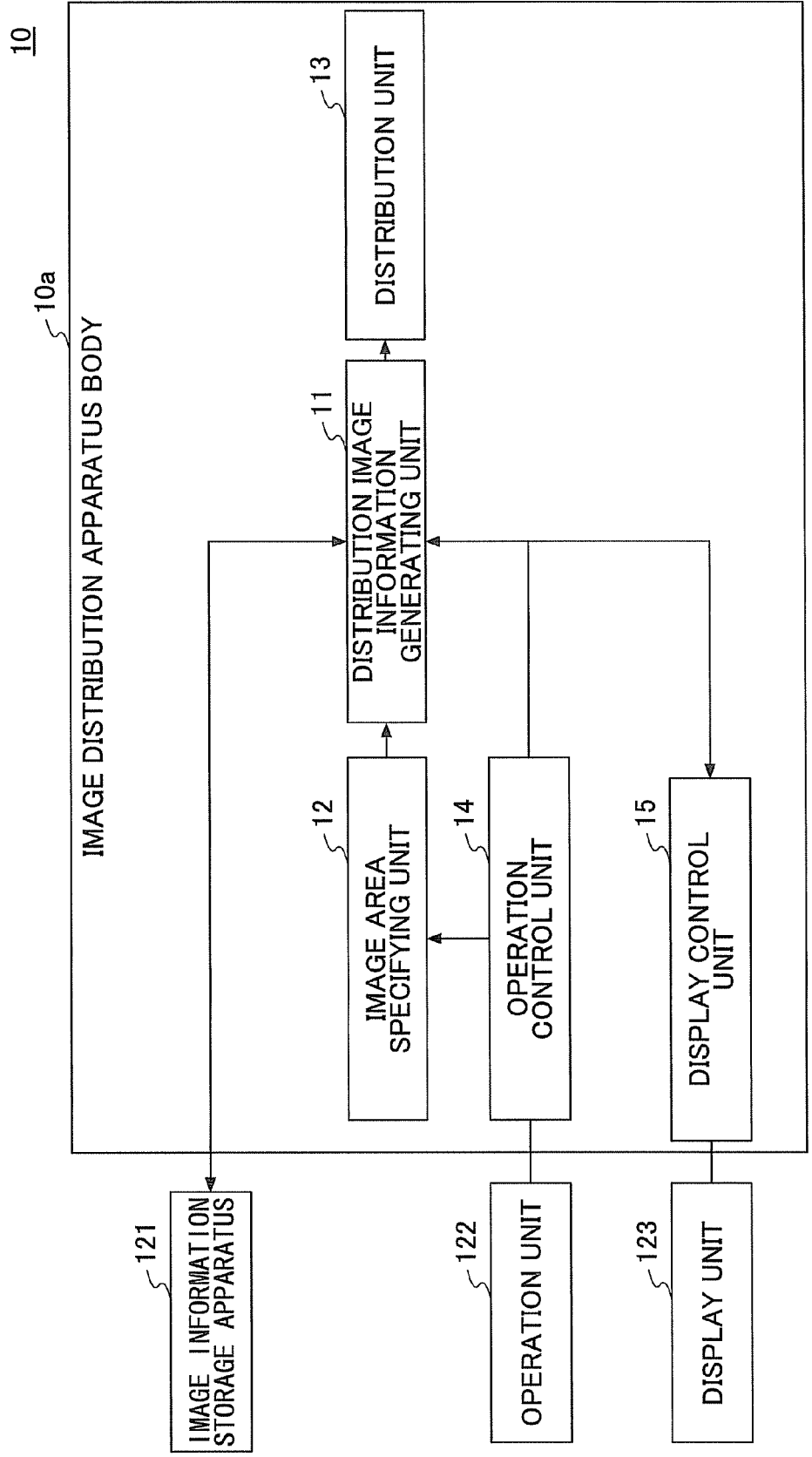
FIG. 3 is a diagram showing one example of a functional configuration of the image distribution apparatus according to a first embodiment of the present invention.

FIG. 3 is a diagram which shows an example of a functional configuration of the image distribution apparatus 10 according to a first embodiment of the present invention. The respective functions are implemented by the CPU 101 executing programs and cooperating with hardware.

The image distribution apparatus 10 includes an image distribution apparatus body 10a, an image information storage apparatus 121, an operation unit 122, and a display unit 123.

For the image information storage apparatus 121, a ROM 102, a RAM 103, and an NVRAM 105 in FIG. 2 are used.

FIG. 4 is a diagram showing one example of information stored in the image information storage apparatus 121. In the image information storage apparatus 121 are stored text information (a text size), etc., that show image data, an image size which shows data amount (total number of pixels in horizontal×vertical) of the image data, a size of a text (font) included in the image data, etc. In addition, metadata such as a title and created year/month/day, etc., of the image data are stored. According to the present embodiment, the image data are stored in a Bitmap format. When the image data are not in the Bitmap format, they are converted to the Bitmap format and stored in the image information storage apparatus 121. When multiple text sizes are included in the same image data, the smallest text size is stored for the text size.

In FIG. 3, the operation unit 108 shown in FIG. 2 corresponds to the operation unit 122, while the display unit 107 shown in FIG. 2 corresponds to the display unit 123.

The image distribution apparatus body 10a includes a distribution image information generating unit 11, an image area specifying unit 12, a distribution unit 13, an operation control unit 14, a display control unit 15, etc.

When an input operation for image distribution in the operation unit 122 by the user is accepted, the distribution image information generating unit 11 generates distribution image information for distributing to the display apparatus 20. The distribution image information includes designated area information designated by the image area specifying unit 12, an image size, and image data stored in the image information storage unit 121. When the distribution image information generating unit 11 generates the distribution image information, distribution of the distribution image is requested to the distribution unit 13.

Of image data displayed in the display unit 123, the image area specifying unit 12 generates designated area information which shows an area designated and transmits it to the distribution image information generating unit 11. The designated area information is generated based on coordinate values corresponding to a pointer position controlled by the operation control unit 14.

Figure 5A:
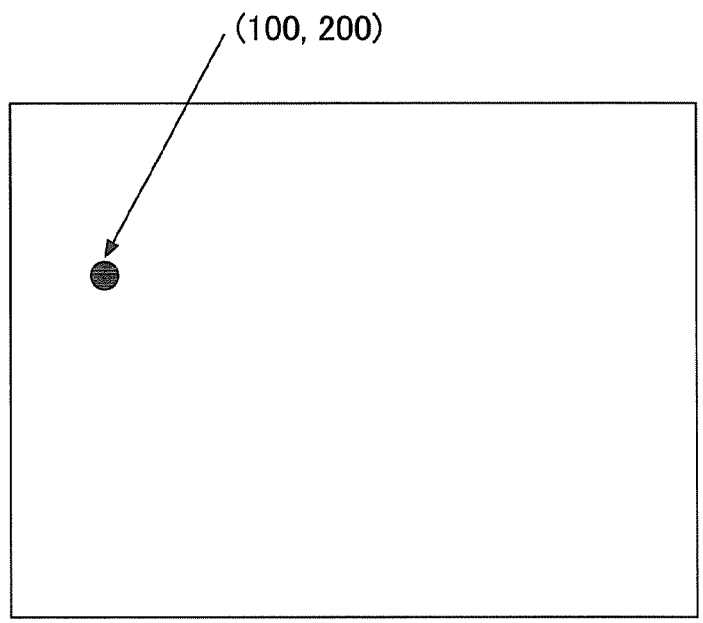
FIGS. 5A and 5B are diagrams showing one example of a method which specifies an area in a display screen.
Figure 5B:
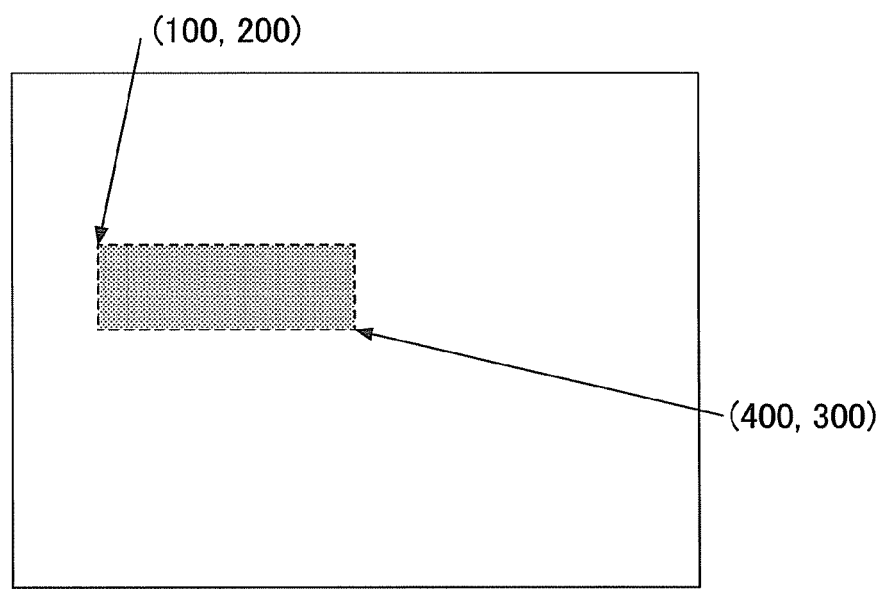

FIGS. 5A and 5B are diagrams showing one example of a method which designates an area in a screen in which the image data are displayed. When a user of the image distribution apparatus 10 designates the area, a set of coordinates which corresponds to the designated area is obtained.

FIG. 5A shows a case in which one point is designated in a display screen, which case is an example in which one point (100, 200) in the image data is designated by a pointer of the operation unit 122 (a mouse).

FIG. 5B shows a case in which an area is designated in the display screen, which is an example in which an area specified by two points is designated, the two points being a position (100, 200) of a pointer at a time of starting an operation in a drag and drop operation of the operation unit 122 (a mouse) and a position (400, 300) of a pointer at a time of completing an operation.

A method of designating the area may be a method other an operation using the mouse, for example, when the operation unit 122 is a touch panel, it may be an operation performed by pinching out or tapping with a finger tip.

Moreover, as shown in FIG. 5B, not only an area which is specified by coordinate values of two points may be designated, but also an area which is surrounded by at least three points when they are plotted may be designated.

When an input of an image distribution request is accepted by the user in the operation unit 122, the distribution unit 13 in FIG. 4 distributes a distribution image generated to the display apparatus 20.

The operation control unit 14 performs a control of an operation in which a user inputs information into the image distribution apparatus 10 by the operation unit 122. According to the present embodiment, an input operation for designating an area in a screen in which image data are displayed is accepted.

The display control unit 15 performs display control in which information for the user is displayed and output on the display unit 123.

Display Apparatus

FIG. 6 is a diagram which shows an example of a functional configuration of the display apparatus 20 according to a first embodiment of the present invention. The respective functions are implemented by the CPU 101 executing programs and cooperating with hardware.

The display apparatus 20 includes a display apparatus body 20a, a display capability storage unit 221, and a display unit 222.

For the display capability storage unit 221, a ROM 102, a RAM 103, and an NVRAM 105 are used.

Figure 7:
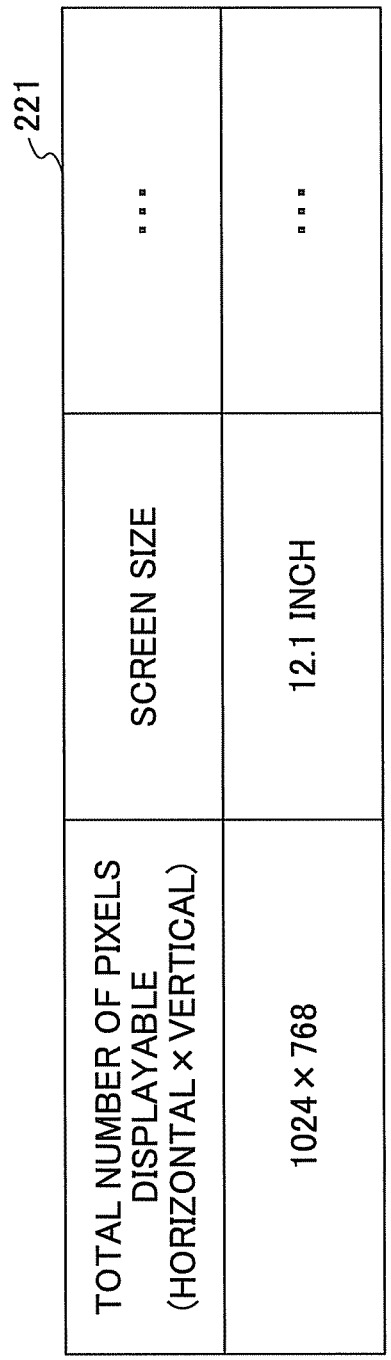
FIG. 7 is a diagram showing one example of a configuration of information stored in a display capability storage apparatus according to the first embodiment of the present invention.

FIG. 7 is a diagram showing an example of information stored in the display capability storage apparatus 221 according to a first embodiment of the present invention. In the display capability storage apparatus 221 is stored a screen size (inch number) which indicates a physical size of the display unit 222 and the total number of pixels which can be displayed by the display unit 222.

The display apparatus body 20a includes a receiving unit 21, a display area determining unit 22, a unit for generating image for display 23, and a display control unit 24.

The receiving unit 21 receives the image data, image size, and designated area information which are distributed from the image distribution apparatus 10.

The display area determining unit 22 determines a display area of image data used for generating an image for display. The display area determining unit 22 obtains a display capability of the display unit 22 that is stored in the display capability storage apparatus 221, determines whether the obtained display capability is at least the received image size, and determines the display area. When the display capability of the display unit 222 is at least the image size, an area displayed in an as is size image data received is set to be a display area. On the other hand, when the display capability of the display unit 222 is less than an image size, an area based on the designated area information out of the image data, which is moved to a center of the display unit 222, is set to be a display area. The image display area determining unit 22 requests the unit for generating image for display 23 generating of an image for display based on information indicating the display area determined.

The unit for generating image for display 23 generates an image for display based on a display area determined by the display area determining unit 22 and requests the display control unit 24 a display output of the image for display.

The display control unit 24 performs control of displaying in which information for the user is displayed and output onto the display unit 123. According to the present embodiment, the generated image for display is displayed and output to the display unit 222.

Processing Procedure for Determining Display Area

Figure 8:
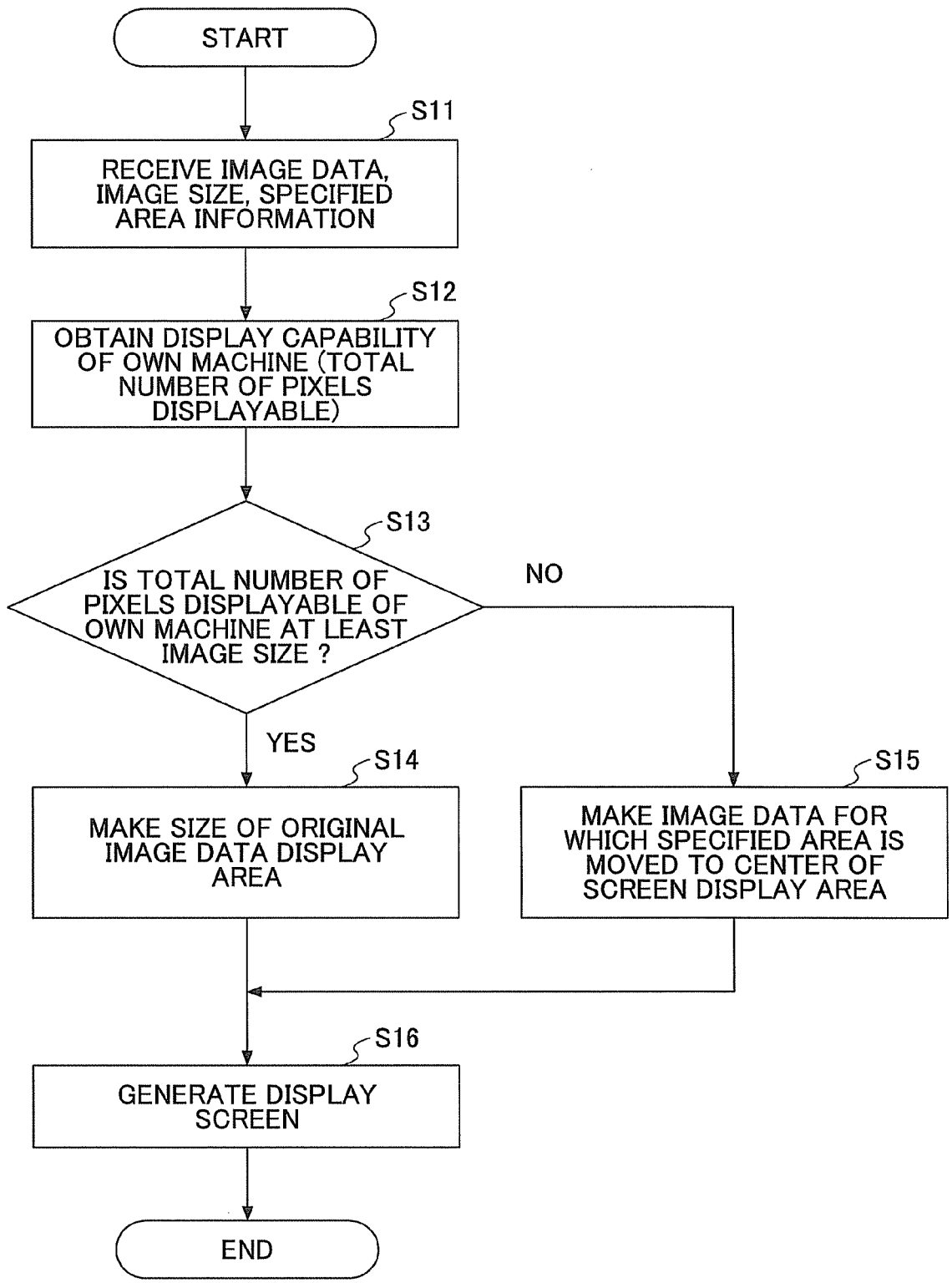
FIG. 8 is a flowchart showing one example of a processing procedure which determines a display area according to the first embodiment of the present invention.

FIG. 8 is a flowchart showing one example of a processing procedure which determines a display area according to the first embodiment of the present invention. A detailed operational procedure related to the image distribution system 1 is described below with FIG. 10.

First, the receiving unit 21 of the display apparatus 20 receives the image data, image size, and designated area information that are distributed from the image distribution apparatus 10 (S11). The display area determining unit 22 obtains a display capability of the display unit 222 of an own machine (S12). Here, the display capability according to the first embodiment is a total number of pixels which can be displayed by the display unit 222. The display area determining unit 22 determines whether the display capability of the own machine is at least an image size received (S13). As a result of determining, if the display capability of the own machine is at least the image size ("YES" in S13), a size as it is of the image data received is set to be a display area (S14). On the other hand, as the result of the determining, if the display capability of the own machine is less than the image size ("NO" in S13), the received designated area, which is moved to a center of the display unit 222, is set to be the display area (S15). The unit for generating image for display 23 generates a screen for display based on a determined display area (S16).

Figure 9:
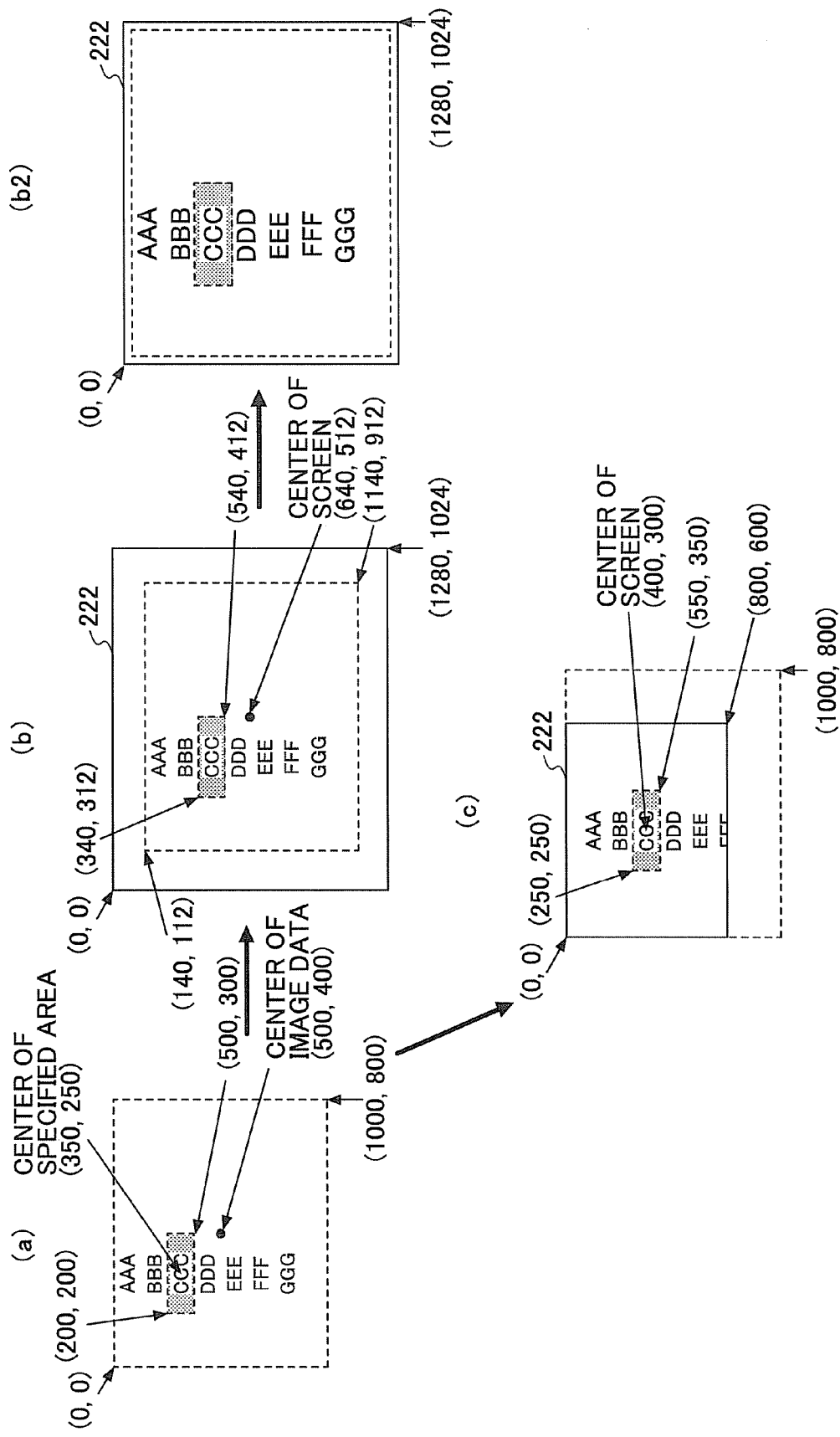
FIG. 9 is a diagram showing one example of a processing method which determines a display area according to the first embodiment of the present invention.

FIG. 9 is a diagram showing one example of a processing method which determines a display area according to the first embodiment of the present invention.

FIG. 9 shows, in (a), image data distributed from the image distribution apparatus 10, whose image size is 1000×800 pixels. A set of coordinates is an absolute set of coordinates with an upper left hand of the image data as an origin (0, 0). Here, a rectangular area determined by two points of (200, 200) and (500, 300) is designated by a user (a presenter) of the image distribution apparatus 10. A set of center coordinates of the designated region is (350, 250). A set of coordinates of a center of the image area is (500, 400).

Methods of processing image data when image data shown in FIG. 9, in (a), are distributed for a display capability (total number of displayable pixels) of the display unit 222 of the display apparatus 20 shown in FIG. 9, in (b) of an SXGA (1280×1024 pixels), and for a display capability of the display unit 222 shown in FIG. 9, in (c) or an SVGA (800×600 pixels) are described. Coordinates in FIG. 9, in (b) and (c), are absolute coordinates with an upper left part of the display unit 222 as the origin (0, 0).

For FIG. 9, in (b), the display capability of the display unit 222 is at least an image size, so that all text data sets shown in the image data may be displayed on the display unit 222. A display area is an area in which the coordinates (500, 400) of a center of image area in FIG. 9, in (a), is moved to coordinates (640, 512) of a center of the display unit 222 in FIG. 9, in (b). With the unit for generating image for display 23, a rectangular area which is determined by two points of (0, 0) and (1280, 1024) in FIG. 9, in (b), is generated as an image for display. Moreover, as in FIG. 9, in (b), when a screen size of the display unit 222 is large and there is a space portion between an image for display and an image size, an image for display may be expanded to the whole screen size of the display unit 222 as in FIG. 9, in (b2).

For FIG. 9, in (c), a display capability of the display unit 222 is less than the image size, so that all text data shown in the image data may not be displayed on the display unit 222. The display area is an area in which a set of coordinates (350, 250) of a center of a designated area of image data in FIG. 9, in (a), is moved to a set of coordinates (400, 300) of a center of the display unit 222. With a unit for generating image for display 23, a rectangular area which is determined by two points of (0, 0) and (800, 600) in FIG. 9, in (c), is generated for an image for display.

(Operation Procedure)

Figure 10:
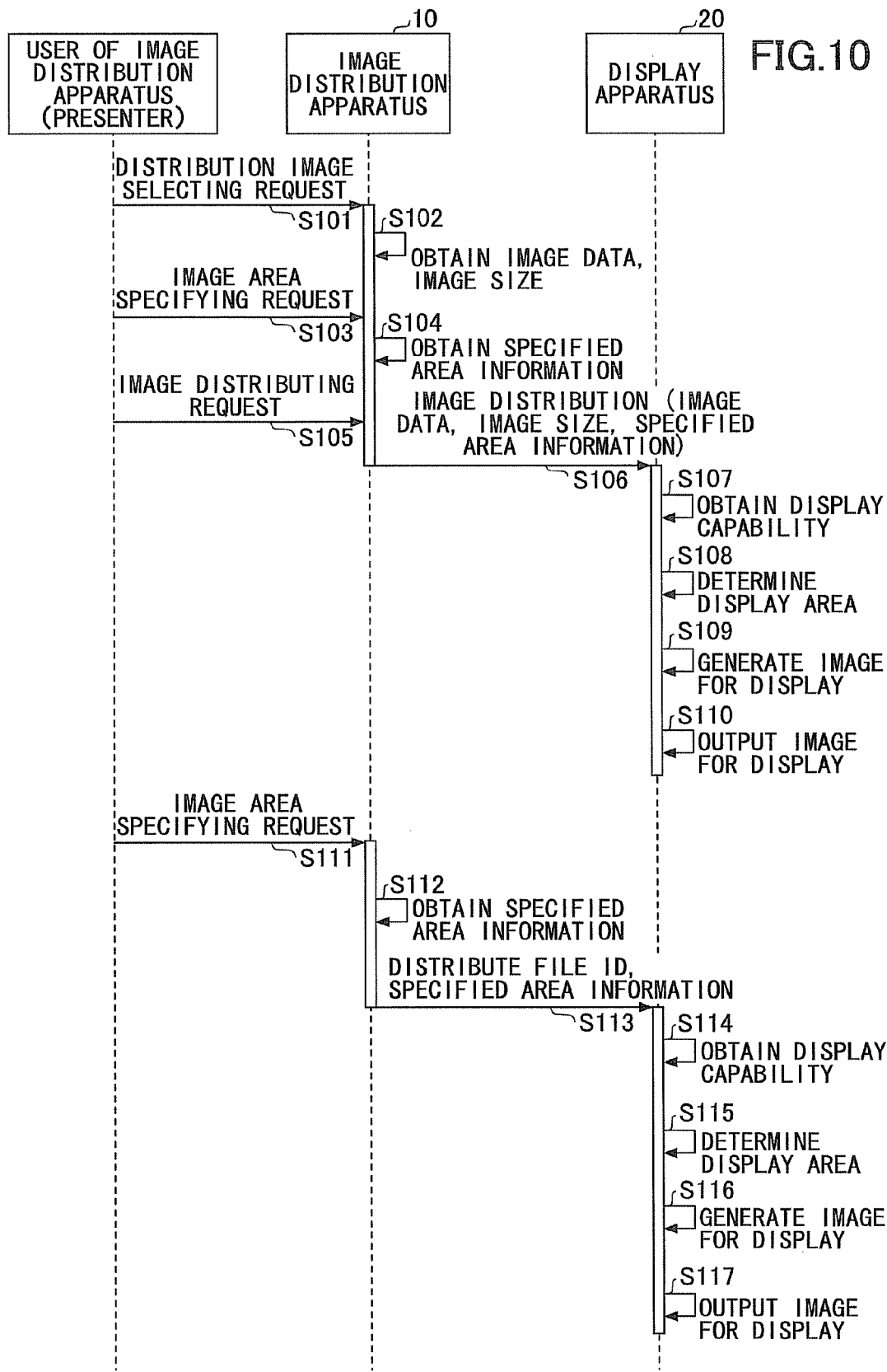
FIG. 10 is a sequence diagram showing one example of an operational procedure of an image distribution system according to the first embodiment of the present invention.

FIG. 10 is a sequence diagram showing one example of an operational procedure of the image distribution apparatus 1 according to a first embodiment of the present invention.

In an initial state in FIG. 10, in the image distribution apparatus 10 and the display apparatus 20, an application for conferencing system has been installed in an NVRAM 105, etc., of the respective apparatuses and launched in advance. For example, the image display apparatus 20 may launch an application for conferencing system upon receiving image data transmitted from the image distribution apparatus 10.

S101: When operating the operation unit 122 controlled by the operation control unit 14, a user (a presenter) of the image distribution apparatus 10 causes an initial screen of an application for conferencing system to be displayed on the display unit 123 by control of the display control unit 15. On the initial screen is displayed a screen which indicates whether to execute image distribution.

Figure 11A:
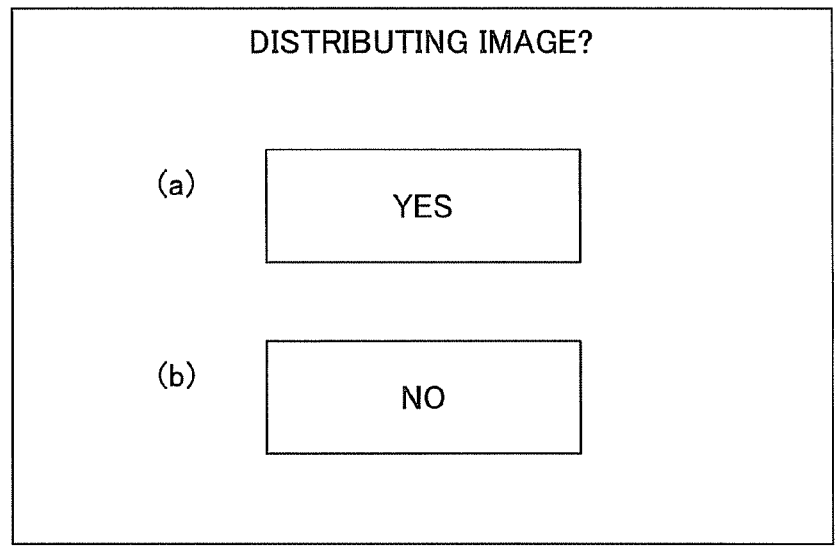
FIGS. 11A and 11B are diagrams showing one example of an initial screen after launching an application for a conferencing system.
Figure 11B:
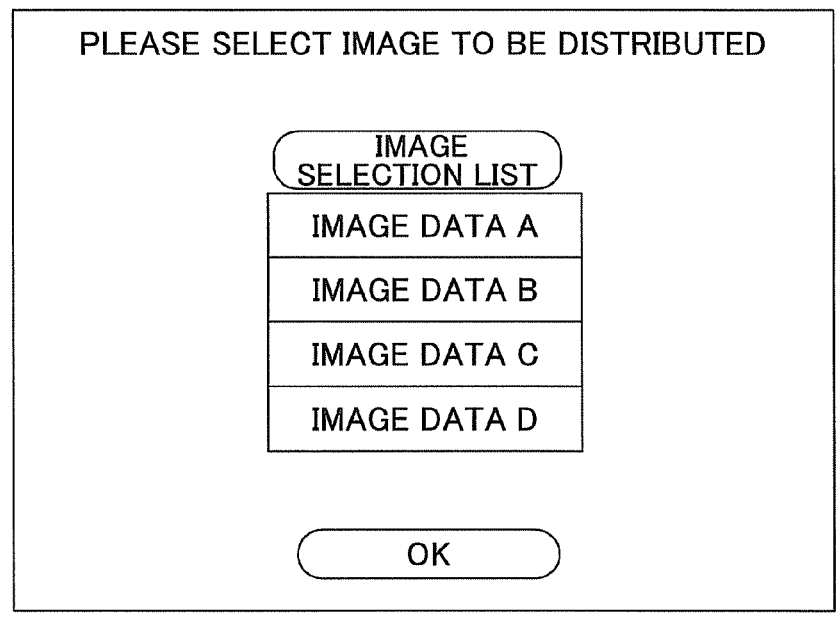

FIGS. 11A and 11B are diagrams showing one example of an initial screen after launching an application shown on the display unit 123. When the presenter wants to perform image distribution, he operates the operation unit 122 to cause a screen shown in FIG. 11A to be displayed. On the initial screen are displayed two soft keys (a) and (b).

(a) "YES" is a soft key selected by the presenter when performing image distribution to the display apparatus 20.

(b) "NO" is a soft key selected by the presenter when not performing the image distribution.

When the presenter selects (b) "NO" in FIG. 11A, the application for the conferencing system is completed. On the other hand, when the presenter selects (a) "YES (distribute image)" in FIG. 11A, the screen transitions to a selection confirmation screen of the distribution image shown in FIG. 11B. The presenter selects image data distributed from an image selection list to input "OK". A method of image selection is such that it may be selected from a thumbnail format in lieu of a list format.

An explanation is given, returning to FIG. 10.

When an input instruction is accepted for a distribution image selection request which selects a distribution of images by the presenter, the operation control unit 14 requests obtaining image data and an image size to the distribution image information generating unit 11.

S102: The distribution image information generating unit 11 obtains image data and an image size that are stored in the image information storage apparatus 121. When the image data to be distributed are selected, an application for conferencing system displays on the display unit 123 a screen designating an area out of the image data.

S103: In a screen displayed in the display unit 123, the presenter performs an area designation in which a set of coordinate values which shows the area is designated by an operation of the operation unit 122 (a mouse, etc.) The set of coordinate values which shows an area designated by the area designation is stored in the RAM 103. The operation control unit 14 reports a completion of a designation operation of an area to the distribution image information generating unit 11. When the area is not designated by the presenter, a set of coordinates in the center of the display screen is to be designated, for example.

S104: The distribution image information generating unit 11 obtains designated area information stored in the RAM 103 and generates distribution image information including image data, an image size, and designated area information.

S105: When the operation control unit 14 accepts an instruction for inputting an image distribution request by a presenter, it requests a process based on the request to the distribution image information generating unit 11. The distribution image information generating unit 11 requests the distribution unit 13 to distribute distribution image information generated.

S106: The distribution unit 13 executes distribution of distribution image information including image data, image size, and designated area information. When the receiving unit of the display apparatus 20 receives distribution image information distributed from the image distribution apparatus 10, it stores the distribution image information received in the RAM 103 of the display apparatus 20 and requests a process involving the receiving to the display area determining unit 22.

S107: From a display capability storage apparatus 221 in which the display capability of the display unit 222 is stored, the display area determining unit 22 obtains a display capability. The display capability, which is the number of pixels displayable by the display unit 22, is determined by performance of a memory, the CPU 101, and the display unit 22.

The display area determining unit 22 requests the unit for generating image for display 23 to generate an image for display based on the determined display area.

S109: When the unit for generating image for display 23 generates an image for display based on the determined display area, it requests the display control unit 24 to display the image for display.

S110: The display control unit 24 displays and outputs the image for display on the display unit 222.

The subsequent steps S111-S117 are operations when area designation is made on the same image data distributed by the image distribution apparatus 10 after displaying and outputting an image for display in the display apparatus 20.

S111: The presenter makes an area designation in a screen on which the same image data as the image data distributed in step S106 perform the area designation. Designated area information designated by the area designation is stored in the RAM 103. The operation control unit 14 reports a completion of an input operation of an area designation to the distribution image information generating unit 11.

S112: When the distribution image information generating unit 11 obtains designation area information and a file ID that indicate the same image data as image data distributed that are stored in the RAM 103, it requests distribution of the designation area information and the file ID to the distribution unit 13.

S113: The distribution unit 13 executes distribution of the designated area information and the file ID. When the receiving unit 21 of the display apparatus 20 receives the designation area information distributed from the image distribution apparatus 10, it requests the display area determining unit 22 to perform a process involving the receiving.

S114: The display area determining unit 22 obtains a display capability from a display capability storage apparatus 221 in which is stored a display capability of the display unit 222.

S115: The display area determining unit 22 obtains, from the RAM 103, an image size received in step S106 that is used when determining the display area. A process of determining the display area is the same as in step S108.

S116: The unit for generating image for display 23 obtains, from the RAM 103, the image data received in step S106 that are used when generating an image for display. When the unit for generating image for display 23 generates an image for display based on a determined display area, it requests the display control unit 24 to display the image for display.

S117: The display control unit 24 displays and outputs an image for display on the display unit 222.

Thereafter, after distribution of the image data, when area designation is performed on the same image data as the distributed image data, an operation of steps S111-S117 is repeated.

As described above, according to the first embodiment of the present invention, image data focused on by the presenter are displayed on a display in accordance with a display capability of the display of the display apparatus 20, so that, even when the display capability of the display of the display apparatus 20 is low, it is facilitated for the participant to understand the explanations of the presenter.

(Second Embodiment)

Differences between the second embodiment and the first embodiment are shown below:

First, within distribution image information distributed from the image distribution apparatus 10, in addition to image data, image size, and designated area information, a text size which indicates a size of a text (a font) of image data is included.

Then, when a display apparatus 20 determines a display area, not only an image size is compared with the number of displayable pixels of the display unit 222, but it is determined whether a text size in the image data is at least a certain size relative to an image size of the display unit 222. Determining the text size is performed based on a reference value of a text size for display that is stored in the display apparatus 20. As a result of determining, when a text size received is less than the reference value, image data is magnified (zoomed) such that it becomes a text size of the reference value. The reference value of the text size for display is a value which differs for each screen size stored in the display capability storage apparatus 221 in advance. The reference value of the text size for display, which is a fixed value predetermined for each screen size by an application for conferencing system, may be arbitrarily set by a user.

In the second embodiment, when a physical screen size of the display unit 222 is small, so that a text size displayed in an image for display becomes small, as the text size is magnified (zoomed) to a level such that it can be visually recognized in the display unit 222, a user (a participant) of the display apparatus 20 can visually recognize a text in a size which is easy to view, so that understanding of the explanations is facilitated.

(System Configuration and Hardware Configuration)

A system configuration and a hardware configuration of the second embodiment have the same configuration as one example of a system configuration of the first embodiment shown in FIG. 1 and one example of a hardware configuration of the first embodiment shown in FIG. 2.

(Functional Configuration)

Differences with the first embodiment are mainly explained.

The distribution image information generating unit 11 of the image distribution apparatus 10 generates distribution image information in which are included a text size in addition to image data, an image size, and designated area information.

FIG. 12 is a diagram showing one example of a configuration of information stored in the display capability storage apparatus 221 of the display apparatus 20. As shown in FIG. 12, therein are stored the total number of pixels displayable by the display unit 222, a screen size (the inch number) that indicates a physical size of the display unit 222, a reference value for text size for display, etc.

The display area determining unit 22 of the display apparatus 20 obtains a screen size and the total number of pixels displayable constituting a display capability of the display unit 222 that is stored in the display capability storage apparatus 221, determines whether the obtained display capability is at least an image size received, and whether the text size is at least a certain size, and determines a display area. If the image size fulfills a criterion of the display capability of the display unit 222, an area in which received image data are displayed in a size as is, is set to be a display area. On the other hand, if the image size does not fulfill a criterion of the display capability of the display unit 222, an area which is magnified to a size corresponding to a display capability of the display unit 222 with an area shown in the designated area information received is set to be a display area.

Processing Procedure for Determining Display Area

Figure 13:
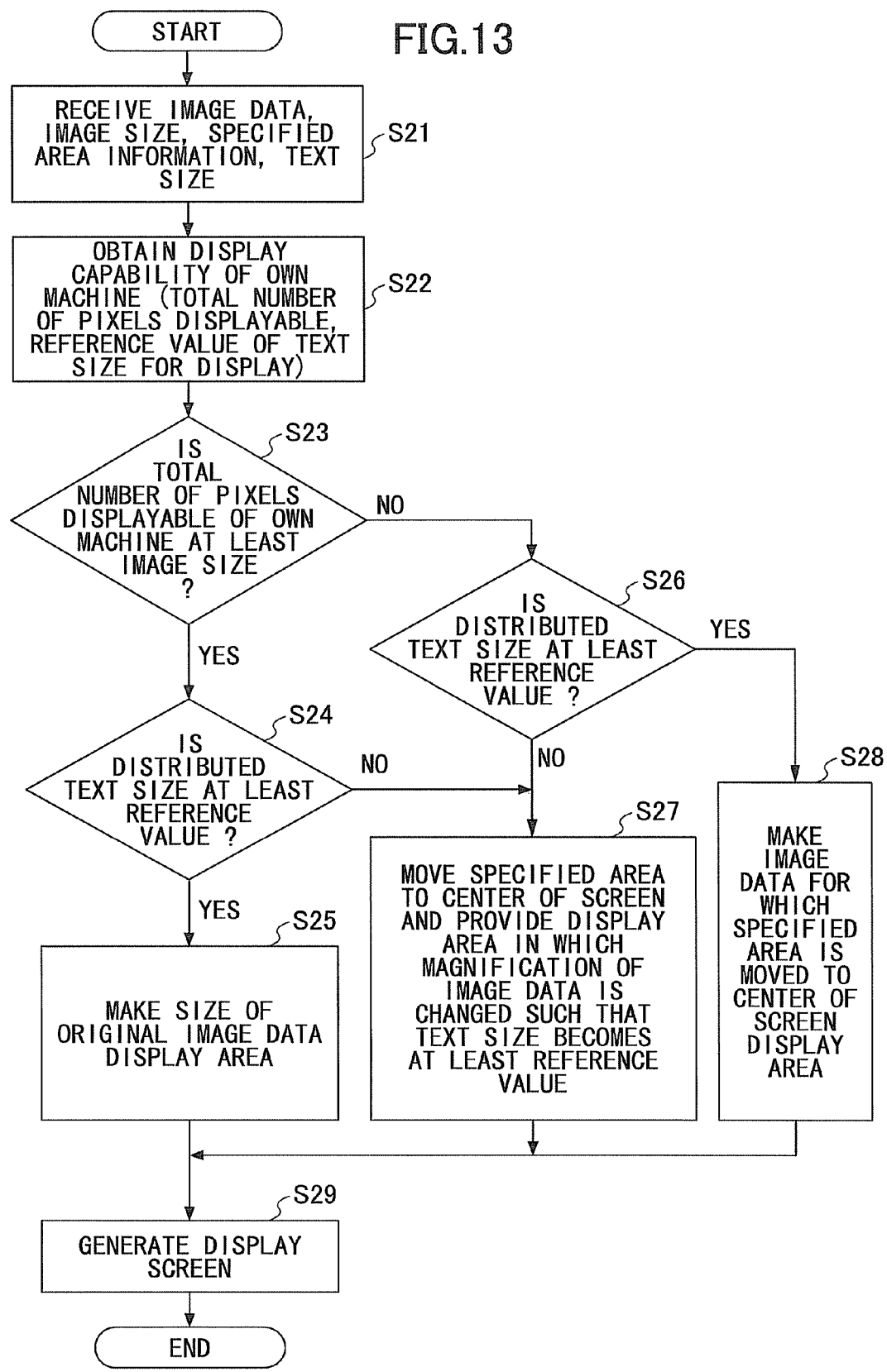
FIG. 13 is a flowchart showing one example of the processing procedure which determines the display area according to the second embodiment of the present invention.

FIG. 13 is a flowchart showing one example of a processing procedure which determines a display area according to the second embodiment of the present invention.

First, the receiving unit 21 of the display apparatus 20 receives a text size, designated area information, an image size, and image data that are distributed from the image distribution apparatus 10 (S21). The display area determining unit 22 obtains a display capability of the display unit 222 of an own machine (S22). Here, the display capability according to the second embodiment is a reference value for text size for display and the total number of pixels displayable by the display unit 222. The display area determining unit 22 determines whether the number of pixels displayable by an own machine is at least a received image size (S23). As a result of determining, when a display capability of an own machine is at least an image size ("YES" in S23), it is determined whether a distributed text size is at least a reference value of text size for display (S24). If the distributed text size is at least the reference value, a size of received image data as it is, set to be a display area (S25). On the other hand, if the number of pixels displayable is less than the reference value ("NO" in S23), it is determined whether the distributed text size is at least a reference value for text size for display (S26). Here, in step S24 or S26, if the distributed text size is less than the reference value for text size for display ("NO" in S24 or S26), the designated area is moved to a center of the display unit 222, and an area in which image data are magnified is set to be a display area such that a text size displayed becomes at least a reference value (S27). Moreover, in step S26, if the distributed text size is at least the reference value for text size for display ("YES" in S26), the distributed designated area that is moved to the center of the display unit 222 is set to be the display area (S28). Furthermore, based on a display area determined, the unit for generating image for display 23 generates a screen for display based on the display area determined (S29).

Figure 14:
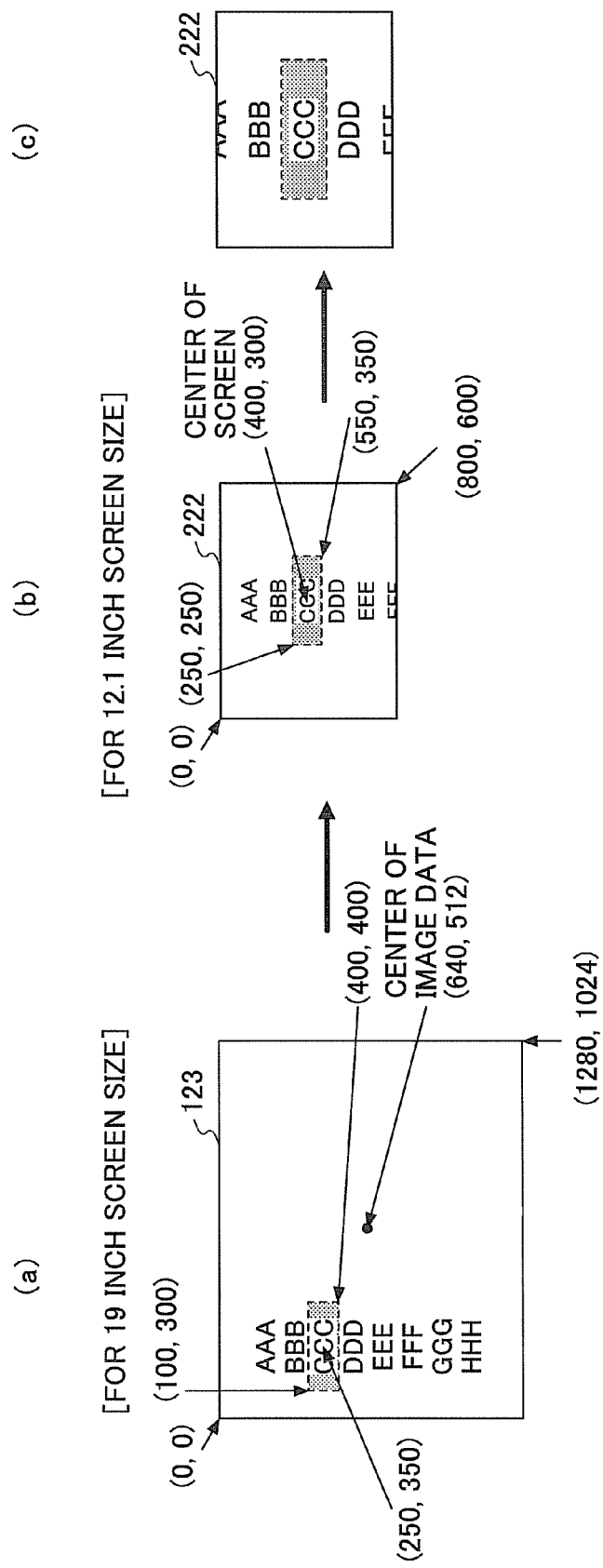
FIG. 14 is a diagram showing one example of the processing method which determines the display area according to the second embodiment of the present invention.

FIG. 14 is a diagram showing one example of a processing method when determining the display area according to the second embodiment. A method of processing in step S25 in FIG. 13 is the same as a case of the first embodiment, so that explanations are omitted. A process of determining the display area corresponding to step S26 is explained.

In FIG. 14, in (a), a screen size of the display unit 123 of the image distribution apparatus 10 is 19 inches, the image size distributed is image data of 1280×1024 pixels, and the text size on the image data is 12 points. A set of coordinates is an absolute set of coordinates with an upper left of the image data being set as an origin (0, 0). Here, by a user (presenter) of the image distribution apparatus 10, a rectangular-shaped area determined by two points of (100, 300) and (400, 400) is designated. A set of coordinates of a center of the designated area is (250, 350).

In FIG. 14, in (b), a screen size of the display unit 222 is 12.1 inches, and a display capability is SVGA (800×600 pixels). A set of coordinates in FIG. 14, in (b), is an absolute set of coordinates with an upper left of the display unit 222 being set as an origin (0,0).

For FIG. 14, in (b), as the display capability of the display unit 222 is less than the image size, not all of text data sets shown in the image data may be displayed on the display unit 222. In order to determine the display area, first a set of coordinates (250, 350) in a center of a designated area of image data in FIG. 14, in (a), is moved to coordinates (400, 300) in a center of the display unit 222 in FIG. 14, in (b). Here, as shown in FIG. 12, a reference value of a text size for display that is stored in the display capability storage apparatus 221 is set to 16 point, for example. A text size of image data distributed is 12 point, so that the text size thereof is less than a reference value for text size for display that is stored. Therefore, as shown in FIG. 14, in (c), image data are expanded such that the text size becomes 16 point on the display unit 222.

(Operation Overview)

Figure 15:
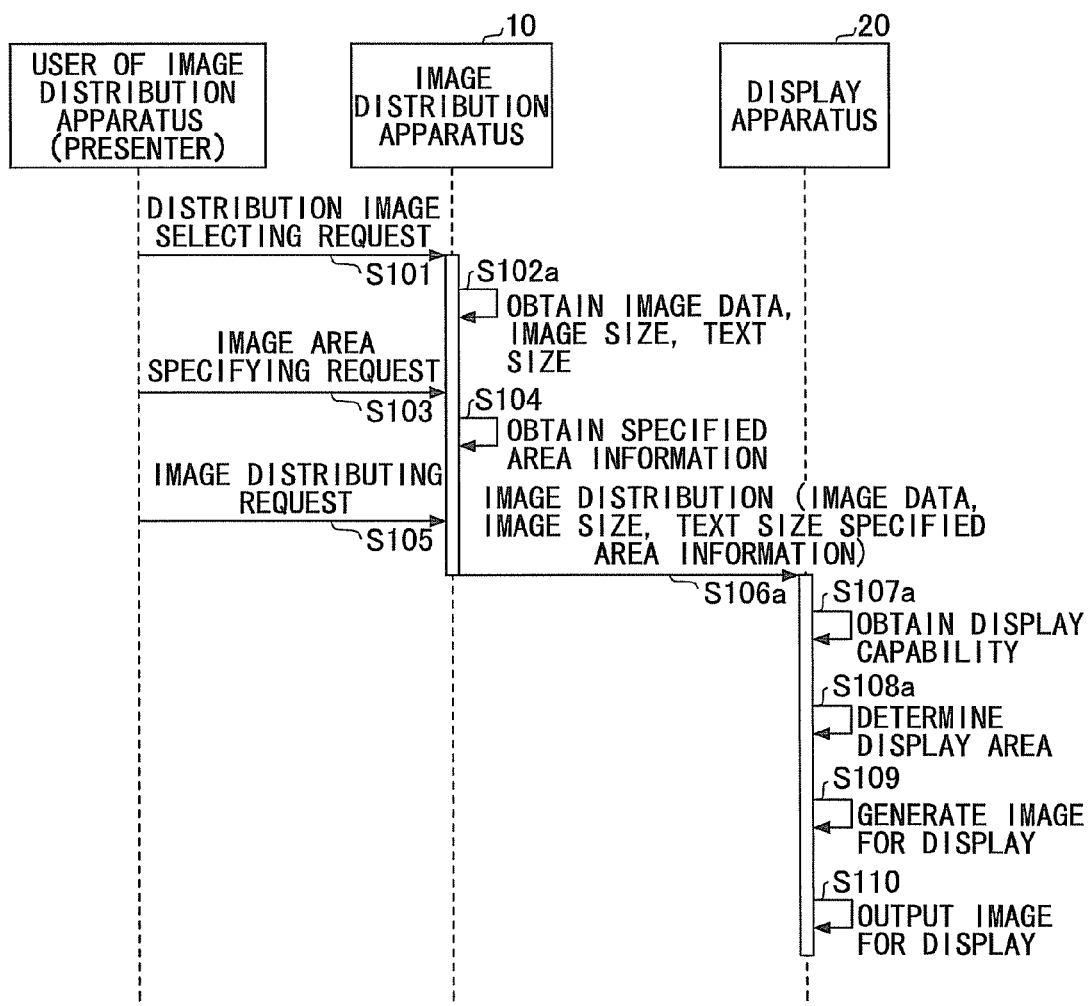
FIG. 15 is an example of a sequence diagram showing an operational procedure according to the second embodiment of the present invention.

FIG. 15 is an example of a sequence diagram showing an operational procedure of the second embodiment of the present invention. In FIG. 15, the same step number is assigned to the same step as FIG. 10, so that an explanation thereof is omitted.

S102a: Based on an input operation which selects a distribution image by a user (a presenter) of the image distribution apparatus, the distribution image information generating unit 11 of the image distribution apparatus 10 obtains a text size, an image size, and image data stored in the image information storage apparatus 121. When the image data to be distributed is selected, an application for conferencing system displays a screen which designates an area of the image on the display unit 123.

S106a: The distribution unit 13 executes distribution of distribution image information including designated area information, a text size, an image size, and image data.

S107a: The display area determining unit 22 of the display apparatus 20 obtains a reference value for text size for display and the total number of pixels displayable by the display unit 22 from the display capability storage apparatus 221.

S108a: First, the display area determining unit 22 determines whether the total number of pixels displayable by the display unit 222 is at least an image size received. Next, it is determined whether a received text size is at least a reference value for a text size for display. Based on determined results, the display area determining unit 22 determines a display area.

As described above, according to the second embodiment of the present invention, when the text size of the image data distributed is small, a certain area of image data focused on by the presenter is expanded, so that it is facilitated for the participant to understand the explanations of the presenter even when a display size of the display apparatus 20 is small.

(Variations)

Below, variations of the above-described embodiments are described.

Figure 16A:
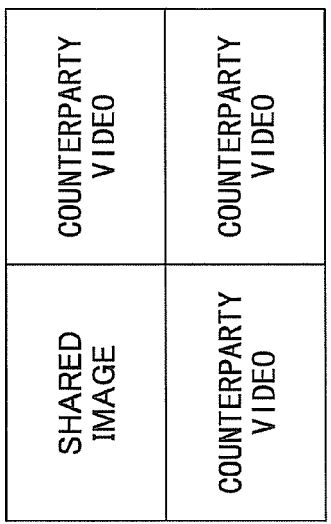
FIGS. 16A, 16B, and 16C are diagrams showing one example of a screen layout configuration of a display unit.
Figure 16B:
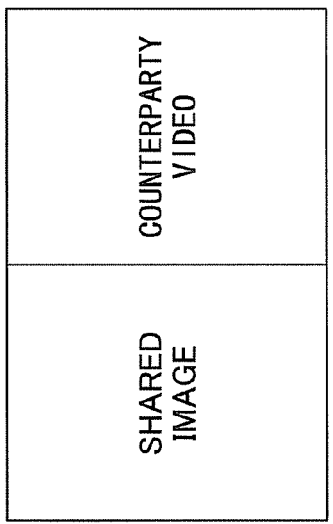
Figure 16C:
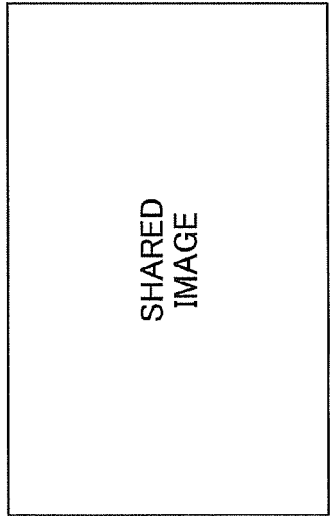

FIGS. 16A, 16B, and 16C are diagrams showing one example of a screen layout (a screen mode) displayed on a display of the display apparatus 20 and the image distribution apparatus 10. Here, the screen layout is a mode (a screen mode) of arrangement of an image, etc., in a screen which may be changed in accordance with the number or type (still or video picture, for example) of an image, etc., that are displayed on the screen. An example is a web conferencing system, which is a system which realizes communications via voice, video, etc., and sharing of material. A screen layout in FIG. 16A is an example in which is displayed only a shared image, in which example a shared image distributed from the image distribution apparatus 10 is displayed on the whole screen on the display. A screen layout in FIG. 16B is an example of a picture-and-picture in which a shared image and a video of a conference participant other than oneself are of the same size and are respectively displayed in halves of the display. A screen layout in FIG. 16C is an example of a multi-view in which a shared image and videos of counterparties who are multiple conference participants are equally divided to be displayed in the display. In an embodiment of the present invention, displaying of each pattern shown in FIGS. 16A, 16B, and 16C is realized by an application for conferencing system. Content displayed on the screen and a configuration of a screen layout are not limited to the above-described configurations.

FIG. 17 is a diagram illustrating one example of a configuration of information stored in a display capability storage apparatus 221 according to a variation of the embodiment of the present invention. In the display capability storage apparatus 221 are stored the total number of pixels displayable, a screen size, and a pattern of a screen layout which is realized by a conferencing system application.

(Operation Overview)

An operational overview of the variation is explained using FIG. 10 in which is shown an operational overview of the first embodiment.

For a variation, in step S107 in FIG. 10, the display area determining unit 22 obtains a screen layout type in addition to the total number of pixels displayable from the display capability storage apparatus 221. Thereafter, the displayable area determining unit 22 determines whether the display capability of the display unit 222 is at least a received image size and determines a display area. Here, in the variation, as a display capability, the number of pixels is used, which is the total number of pixels displayable multiplied by an area ratio of a screen in which a shared image is displayed. In this way, for a layout format of a picture-and-picture shown in FIG. 16B, for example, a half of the total number of pixels displayable becomes a display capability.

As described above, according to a variation of the present invention, a certain area of an image that is focused on by a presenter is expanded in accordance with a layout configuration of a display screen, so that it is facilitated for the participant to understand the explanations of the presenter even when a display screen of a shared image of the display apparatus 20 is small.

(Other Variations)

While distribution, area designation, receiving, etc., of an image are realized using an application for conferencing system, they may be realized by a dedicated terminal for an image distribution system that is provided with functions of the image distribution apparatus 10 and the display apparatus 20.

While image data of a Bitmap format are stored in a storage apparatus and received and transmitted via a network in the present embodiment, they may be converted into a reversible compression-type file format such as a GIF (graphic interchange format), a PNG (portable network graphics), etc. In this way, data of the Bitmap format with generally a large data volume can be compressed to reduce a burden on a network and a storage area. Moreover, an operation of image data is not executed as a Bitmap format, but may be made a JPEG or a PDF (portable document format).

As a reference for determining a display area stored in the display capability storage apparatus 221 as listed in the present embodiment, a communications speed of the network 99, which is connected via the display apparatus 20, may be used, for example.

In the foregoing, embodiments of the present invention are not to be limited to the specific embodiments, so that variations and changes are possible within a range of the gist of the present invention as claimed.

The present application is based on Japanese Priority Application No. 2012-130144 filed on Jun. 7, 2012, the entire contents of which are hereby incorporated by reference.

The invention claimed is:

1. A display apparatus which is connected to an image distribution apparatus and which displays an image for display that is generated based on an image distributed from the image distribution apparatus, comprising:

a receiving unit which receives the image transmitted from the image distribution apparatus and designation information which indicates a designated area related to the image;

a display area determining unit which determines a display area based on a data amount of the image distributed from the image distribution apparatus and a display capability of the display apparatus; and a unit which generates an image for display based on the display area determined by the display area determining unit, wherein, when a data amount of the image does not meet a reference of the display capability of the display apparatus, the display area determining unit determines a display area with an area related to the image that is indicated in the designation information as a center.

2. The display apparatus as claimed in claim 1, wherein the display area determining unit determines a display area such that text information displayed in the image for display meets a reference of the display capability of the display apparatus.

3. The display apparatus as claimed in claim 2, wherein the reference of the display capability further includes a screen mode displayed in the display apparatuses.

4. An image distribution system including an image distribution apparatus and multiple display apparatuses, the image distribution apparatus including a distribution unit which distributes an image to be displayed in the display apparatus, wherein the image distribution apparatus includes a specifying unit which designates an area of the image, wherein the distribution unit distributes information indicating an area designated by the specifying unit, and wherein the display apparatus includes a receiving unit which receives the image transmitted from the image distribution apparatus and designation information which indicates a designated area related to the image;

a display area determining unit which determines a display area based on a data amount of the image distributed from the image distribution apparatus and a display capability of the display apparatus; and a unit which generates an image for display based on the display area determined by the display area determining unit, wherein, when a data amount of the image does not meet a reference of the display capability of the display apparatuses, the display area determining unit determines a display area with an area related to the image that is indicated in the designation information as a center.

* * * * *